(12) United States Patent
Weisbach

(10) Patent No.: US 8,526,780 B2
(45) Date of Patent: Sep. 3, 2013

(54) THERMOGRAPHIC CAMERA AND METHOD FOR THE RECORDING AND/OR MODIFICATION AND REPRODUCTION OF THERMAL IMAGES OF A SCENE AND/OR OF AN OBJECT

(75) Inventor: Frank Weisbach, Jena (DE)

(73) Assignee: ESW GmbH, Wedel (DE)

( * ) Notice: Subject to any disclaimer, the term of this patent is extended or adjusted under 35 U.S.C. 154(b) by 281 days.

(21) Appl. No.: 13/155,075

(22) Filed: Jun. 7, 2011

(65) Prior Publication Data

US 2011/0299826 A1    Dec. 8, 2011

(30) Foreign Application Priority Data

Jun. 7, 2010    (DE) .......................... 10 2010 023 170

(51) Int. Cl.
H04N 5/77    (2006.01)

(52) U.S. Cl.
USPC .......................................... 386/227

(58) Field of Classification Search
None
See application file for complete search history.

(56) References Cited

U.S. PATENT DOCUMENTS

| 5,083,204 A | 1/1992 | Heard et al. |
| 2010/0046577 A1 | 2/2010 | Sheard et al. |

FOREIGN PATENT DOCUMENTS

| DE | 19715983 C1 | 9/1998 |
| DE | 69830731 T2 | 5/2006 |

OTHER PUBLICATIONS

FLIR—The Smallest, Lightest, Lowest-Power IR Camera Core. Period company publication, FLIR Systems, Inc., Rev 2, 2009 FLIR system, Inc. All right reserved Rev2, 908483.
FLUKE: Ti32, TiR32 Thermal Images. Users Manual. Company publication FLUKE Corporation, PN 3433221 Jul. 2009.
Eddie Y.-K. Ng et al., "Remote-Sensing Infrared Technology", IEEE Engineering in Medicine and Biology Magazine, Jan./Feb. 2009, vol. 28, No. 1, pp. 76-83.

Primary Examiner — William C Vaughn, Jr.
Assistant Examiner — Daniel Tekle
(74) Attorney, Agent, or Firm — Patentbar International P.C.

(57) ABSTRACT

The present invention is directed to a thermographic camera and to a method for generating thermal images with this thermographic camera as is described generically in DE 698 30 731 T2. The object of the invention is to provided a possibility for achieving an optimal signal resolution at low object temperatures in an economical manner without signal overload at high temperatures. This object is met by a method for the recording and reproduction of thermal images of a scene and/or of an object, comprising the following steps: a pixel-based thermal image frame is generated by means of IR optics and a pixel-based detector unit; a dark image is generated for implementing a non-uniformity correction (NUC) to eliminate non-uniformities arising from the detector and/or disturbance sources in the optical beam path; the existing pixel-based thermal image frame is corrected by weighting the individual pixel signals with a nonlinear characteristic line which is generated and stored beforehand for generating a corrected output thermal image; and finally, the corrected output thermal image is supplied to a display unit or to an interface for external equipment.

9 Claims, 4 Drawing Sheets

THERMOGRAPHIC CAMERA AND METHOD FOR THE RECORDING AND/OR MODIFICATION AND REPRODUCTION OF THERMAL IMAGES OF A SCENE AND/OR OF AN OBJECT

RELATED APPLICATIONS

This application claims priority to German Patent Application No. DE 10 2010 023 170.3, filed Jun. 7, 2010, which is incorporated herein by reference in its entirety.

FIELD OF THE INVENTION

The present invention is directed to a thermographic camera and a method for producing thermal images with a thermographic camera such as is described generically in DE 698 30 731 T2.

BACKGROUND OF THE INVENTION

Thermography is an imaging method which renders visible the thermal radiation (mid-infrared to far infrared) of an object or body that is not visible to the human eye. In thermography, temperature distributions on surfaces and objects are acquired and displayed. Thermography is a non-contact measurement method.

Images that are generated by infrared cameras are initially gray scale. Current camera models are capable of displaying up to 256 (8 bit) gradients of gray. However, it is impossible for a human observer to resolve such fine gray gradients with certainty. Therefore, it is useful to generate images in a false-color mode, of which almost all thermographic cameras are capable. The eye is better able to distinguish color differences than brightness differences. The intensity of the thermal radiation in the image that is colored in this way is represented by the hue and not by different gray values. Different color palettes are commonly available for coloring the grayscale images. Often, the brightest—warmest—part of the image is shown in white, intermediate temperatures are shown in shades of yellow and red, and the dark, i.e., colder, parts of the image are shown in shades of blue.

Thermographic cameras may be divided into two types: systems with cooled infrared image detectors and those with uncooled detectors.

Cooled infrared detectors usually comprise an array of photoreceivers which operate on the principle of inner photoelectric effect. The detectors are commonly accommodated in a vacuum-sealed housing and are cooled cryogenically. Accordingly, as a rule, the detectors are much colder than the objects to be observed so that there is an important increase in the thermal sensitivity (temperature resolution) of the thermographic system compared to uncooled systems. One disadvantage of this method is that if the cooling of the detector fails, the thermographic system is "blind." Other drawbacks of cooled systems include the higher acquisition costs and operating costs and the occasional long start-up periods before the system has cooled the detector down to operating temperature. On the other hand, the image quality is excellent compared to uncooled systems.

Uncooled thermographic cameras use detectors operating at ambient temperature. All modern uncooled systems operate on the principle of change in resistance, voltage, or current intensity when the detector is heated by infrared radiation. These changes are measured and compared with the values at operating temperature. The amount of received radiation is determined from this and a temperature is calculated with the aid of a preadjusted emission factor.

Uncooled infrared sensors are kept at constant temperature by thermoelectric Peltier coolers (TECs) to reduce signal drift of the receiver elements. There are also thermally unstabilized (TEC-less) detectors. Systems of this kind make do without expensive, cumbersome cooling devices. Therefore, these thermographic systems are appreciably smaller and less expensive than cooled systems. However, they deliver comparatively poorer results.

Uncooled detectors use pyroelectric or microbolometer arrays. The detector cell of a microbolometer array comprises a microbridge structure, a thermally insulated plate having a thickness of <1 µm which is suspended over the substrate by two electric contacts. The plate is made of a material with a highly temperature-dependent resistance (for example, vanadium oxide). The incident infrared radiation is absorbed and leads to an increase in temperature of the plate which in turn changes the resistance. The measured voltage drop is outputted as a measurement signal.

Pyroelectric sensors on the other hand deliver a voltage with a very high source impedance only when there is a change in temperature.

Both microbolometer arrays and pyrometric sensors require a mechanical chopper or at least an intermittent shading of the image sensor. In pyrometric sensors, the reason for this is that they can only respond to temperature changes. In bolometer arrays, the chopper or shutter is used for obtaining a dark image which is subtracted from the recorded image pixel for pixel as a sensor-specific reference (each pixel has a distinctly different resistance). This is usually done by means of a two-point correction (DE 698 30 731 T2), i.e., a correction by means of an offset and a slope, that is, a linear approximation. Also, the presentation of the image data is then carried out as a rule either directly or by means of a linear transfer characteristic (by means of an offset and a slope).

However, a linear signal display requires a compromise between resolution and dynamics. With a steep characteristic, cold objects are capable of good thermal resolution, but high object temperatures quickly lead to saturation. Conversely, with a flat characteristic that is optimized for high temperatures, details can no longer be perceived.

SUMMARY OF THE INVENTION

It is the object of the invention to show a possibility by which an optimal signal resolution can be achieved with the least possible effort at low object temperatures without signal overload at high temperatures.

According to the invention, this object is met through a method for recording and/or modification and reproduction of thermal images of a scene and/or of an object, comprising the following steps:

a pixel-based thermal image frame is generated by means of IR optics and a pixel-based detector unit or is retrieved from an external source, a dark image is generated for implementing a non-uniformity correction (NUC) to eliminate non-uniformities arising from the detector and/or disturbance sources in the optical beam path, the existing pixel-based thermal image frame is corrected by weighting the individual pixel signals with a nonlinear characteristic line which is generated and stored beforehand for generating a corrected output thermal image, and finally, the corrected output thermal image is supplied to a display unit or to an interface for external equipment.

It is advantageous to apply for every pixel an individually adapted nonlinear characteristic line associated with it. This nonlinear characteristic line can also be identical for every pixel. Further, the characteristic line of every pixel can be monotonically increasing or monotonically decreasing, strictly monotonically increasing, or strictly monotonically decreasing. Further, the characteristic line can be steeper or flatter with lower input signals than with higher input signals.

It can also be advantageous when the compression parameter k describing the curvature of the characteristic line is constant for input signals up to a threshold and extends linearly with a positive slope above the threshold. The slope can be switchable between a plurality of possible choices above the threshold.

After the characteristic line is applied, a color display can be carried out according to a color table. The color table can attach gray values to signals below a lower threshold, the colors yellow, orange, and red to signals between the lower threshold and an upper threshold in ascending order, and the color red to signals above the upper threshold. However, the color table can also attach gray values to signals below a lower threshold, a quantity of determined colors with a fixed sequence from a lowest color to a highest color to signals between the lower threshold and an upper threshold in ascending order, and the highest color to signals above the upper threshold.

Further, the above-stated object is met through a thermographic camera for the recording and reproduction of thermal images of a scene and/or of an object comprising:

an IR objective and a pixel-based detector unit for recording a pixel-based thermal image frame, and a processor unit, wherein the processor unit controls the processes for recording and correction, such as a non-uniformity correction (NUC) and a weighting of the pixel signals with a nonlinear characteristic line of the pixel-based thermal image frame for generating a corrected output image, and the corrected output image is made available to a display unit and/or to an interface for external equipment.

It can be advantageous when an individual nonlinear characteristic line is stored for every pixel. Further, the characteristic line of every pixel can be monotonically increasing or monotonically decreasing, strictly monotonically increasing, or strictly monotonically decreasing. Further, the characteristic line can be steeper or flatter with lower input signals than with higher input signals in this thermographic camera.

It can also prove advantageous when the compression parameter k describing the curvature of the characteristic line is constant with input signals up to a threshold and is linear with a positive slope above the threshold. The slope can be switchable between a plurality of possible choices above the threshold during operation of the thermographic camera.

In the thermographic camera according to the invention, a color display can be carried out according to a color table after the characteristic line is applied. The color table can attach gray values to signals below a lower threshold, the colors yellow, orange, and red to signals between the lower threshold and an upper threshold in ascending order, and the color red to signals above the upper threshold. The color table can also attach gray values to signals below a lower threshold, a quantity of determined colors with a fixed sequence from a lowest color to a highest color to signals between the lower threshold and an upper threshold in ascending order, and the highest color to signals above the upper threshold. A quantity of eight colors can be selected.

By "pixel-based" is meant in the present Application that the image is discrete with a determined quantity and arrangement of positions at which image intensities are measured. This is usually a row-column matrix structure, but need not be, per se. The methods presented herein do not presuppose a matrix structure, per se; rather, they also remain applicable with a different arrangement of pixels. What is important is that the arrangement remains the same when different images are to be computed with respect to one another, for example, when the dark image acquired as a sensor-specific reference with closed shutter is subtracted pixel for pixel from the recorded thermal image. Accordingly, "pixel-based" means that the corresponding calculation is carried out for every pixel position. Parameters such as sensitivity characteristics, etc. can then generally vary from pixel position to pixel position and need not be identical for the entire image.

By "characteristic line" is meant a mathematical function $f(x)$ which uniquely assigns an output signal to an input signal. Mathematically speaking, it may be (strictly) monotonically increasing or decreasing.

BRIEF DESCRIPTION OF THE DRAWINGS

The invention will be described more fully in the following with reference to embodiment examples. The accompanying drawings show.

DETAILED DESCRIPTION OF THE PREFERRED EMBODIMENTS

Figure 1:
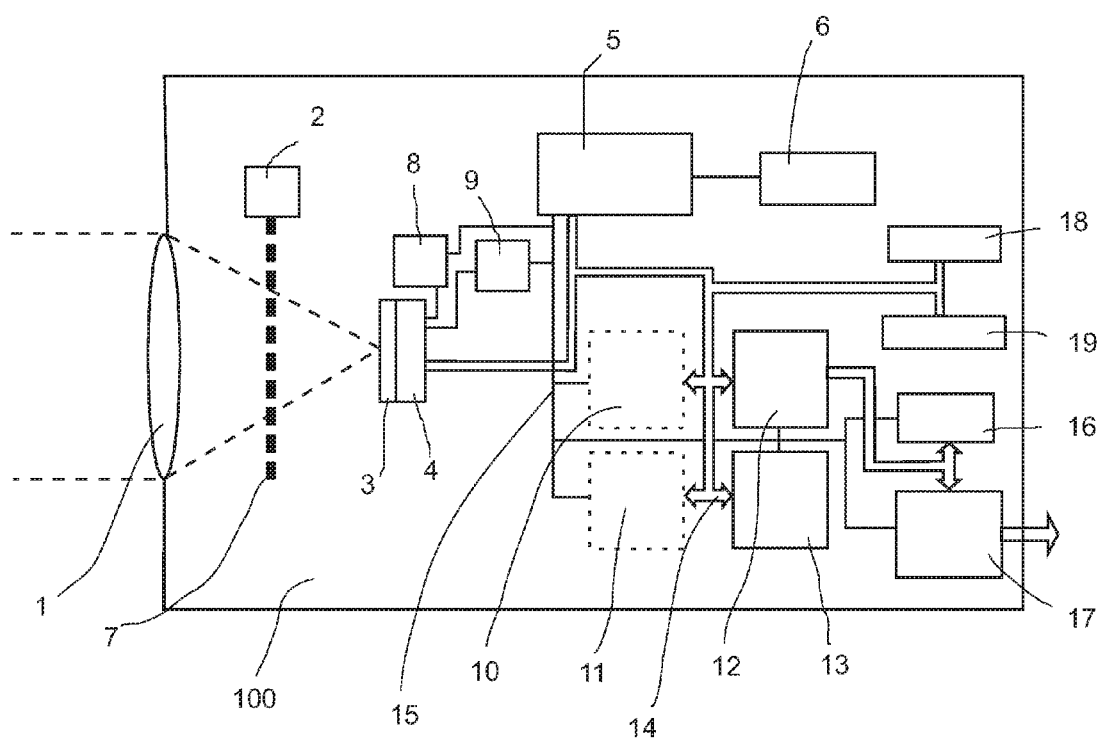
FIG. 1 a schematic diagram of a thermographic camera according to the invention.

FIG. 1 shows a thermographic camera 100 with its essential components comprising IR optics 1, shutter control device 2, microbolometer FPA (focal plane array) 3, readout unit 4, and processor unit 5.

The IR optics 7 project an infrared image on the microbolometer FPA (focal plane array) 3. The microbolometers are generally arranged in matrix shape. However, as was already mentioned above, other arrangements are also conceivable. The processor unit 5 controls the microbolometer FPA 3 in a clock pulse given by the clock control 6 for recording frames in a corresponding manner. Further, the processor unit 5 controls the shutter control device 2 in a shutter clock that can be given as an adjustable parameter to swivel the shutter 7 into or out of the beam path so that dark images and thermal images are generated alternately in a determined sequence.

When the shutter 7 is swiveled in, this means that the beam path is interrupted and the microbolometer FPA 3 receives only radiation proceeding from disturbance sources and no longer receives the radiation of the object to be imaged. When the shutter 7 is closed, a dark image of the shutter 7 is generated as a reference which is used to compensate for nonuniformities of the individual microbolometer components (non-uniformity correction [NUC]). Conversely, when the shutter is swiveled out the radiation originating from the object to be imaged is admitted to the microbolometer FPA 3 via the IR optics 1. Further, the processor unit 5 controls the bias of the readout unit 4 by a bias generator 8 or controls the integration time of the readout unit 4 by means of an integration time preset unit 9.

FIG. 1 further shows an intermediate storage 10 for a recorded thermal image frame, an intermediate storage 11 for a dark image frame, an intermediate storage 12 for the corrected thermal image, and an intermediate storage 13 for the dark image, which are used for the correction.

It should be noted in this connection that the intermediate storage 10 for a recorded thermal image frame and the intermediate storage 11 for the dark image frame are not strictly necessary. Therefore, they are shown only in dashed lines in FIG. 1. An intermediate storage for the thermal image frame and dark image frame can be omitted when the latter are further processed directly as a data stream, which is quite advantageous because an intermediate storage would be time-critical and expensive at such high data rates.

As will be discussed later, the correction with a nonlinear characteristic line can be carried out before or after a dark image correction depending on the embodiment form. It can supplement it or possibly even entirely replace it.

IR sensors such as microbolometer FPAs 3 generally do not deliver a temperature-linear output signal but, rather, a signal proportional to the radiation energy. Therefore, a display which is linear to the output signal would greatly distort the representation of temperature. A linear temperature display is achieved in certain embodiment forms by the nonlinear characteristic line.

An image data bus 14 connects the processor unit 5 to all of the intermediate storages 10, 11, 12, 13 for transferring the image data. As is further shown in FIG. 1, the processor unit 5 is connected by control lines and address lines 15 to the intermediate storages 10, 11, 12, 13, each of which can likewise have a bus structure.

The processor unit 5 can load the image data via these bus structures for processing and storage. The processed image data can be displayed to the user subsequently by a display unit 16 or sent to an external computer, not shown, via a computer interface 17.

Further, the processor unit 5 can have read-and-write access to an intermediate storage 18 for the gain and to an intermediate storage 19 for the offset. These intermediate storages 18, 19 for gain and offset can be storages for individual values in case gain and offset are given as individual scalar values. However, each of these intermediate storages 18, 19 for gain and offset can also be a complete matrix in case gain and offset are given individually for each pixel position. Gain and offset are used particularly for two-point correction. This can be carried out pixel by pixel or uniformly for all pixel positions identically. The values or value matrices for gain and offset are usually fixed by factory calibration. However, other fixed-term modes of operation are also conceivable.

Figure 2:
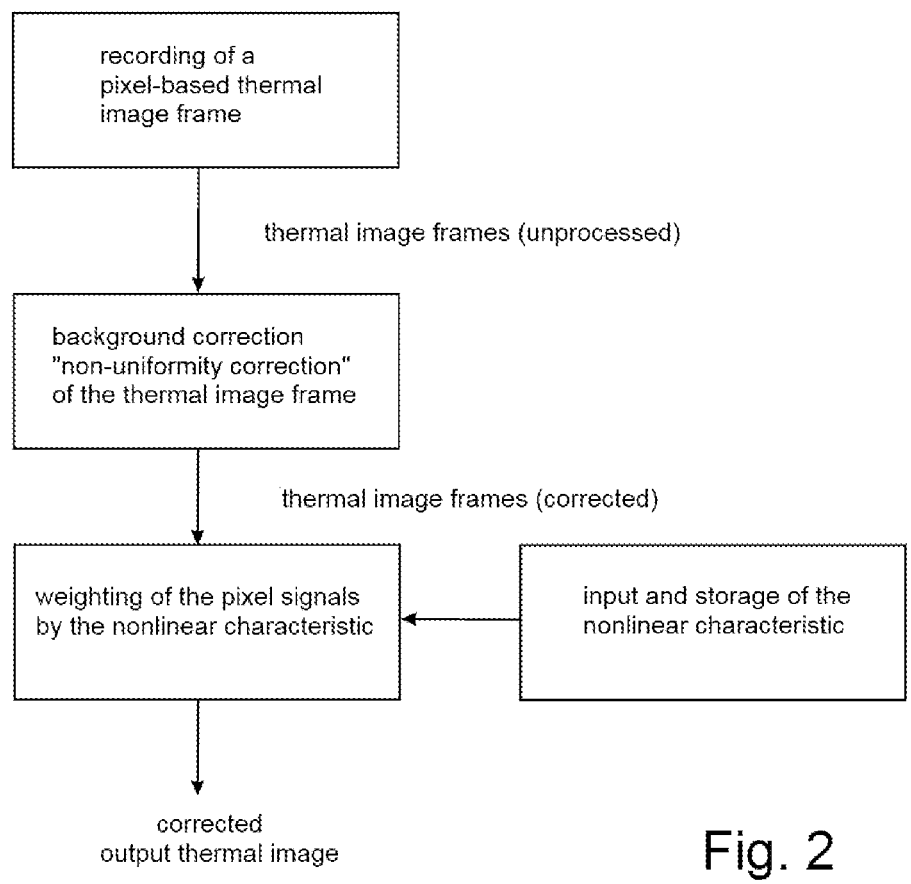
FIG. 2 a flowchart showing the method according to the invention.

FIG. 2 shows a flowchart of the method according to the invention. A pixel-based thermal image frame is first recorded by means of a thermographic camera 100 which comprises a pixel-based detector unit and a processor unit 5.

In the present embodiment form of the method, a microbolometer FPA 3 is used for this purpose. However, the method according to the invention need not be limited to a microbolometer component. It can be used for thermal images obtained by means of microbolometer components, but can also be used on thermal images obtained by means of different sensors such as CCD sensors or CMOS sensors.

In a microbolometer component, the raw thermal image frame is usually subsequently subjected to a dark image correction, known as a non-uniformity correction (NUC), to compensate for non-uniform sensitivities of the individual pixel signals. After the NUC, an NUC-corrected thermal image frame is obtained. The pixel signals of this NUC-corrected thermal image frame are then weighted by their respective nonlinear characteristic lines which were entered and stored prior to the image recording, usually in the course of a calibrating process, for every pixel position. The result is a corrected output image which is displayed on a display unit 10 of the thermographic camera 100 or is sent to an external computer via a computer interface 17.

The image signal is in pixel-based form. In practice, it is often sufficient to employ only one nonlinear characteristic line that is used for all of the pixels. This saves storage space and processor computing power and the thermographic camera 100 is therefore less expensive to produce. However, it may also be useful for every pixel to have its own nonlinear characteristic line which can—and generally does—deviate from the nonlinear characteristic line of the other pixels. Also, it is not necessary to carry out the non-uniformity correction first and then to carry out the correction with the nonlinear characteristic lines subsequently. If every pixel has its own nonlinear characteristic line, it may be quite possible and useful to correct the NUC at the same time by means of the variation of these nonlinear characteristic lines so that the correction with the nonlinear characteristic line(s) is applied directly to the raw thermal image frame.

In specific embodiment forms of the invention, a color palette can be selected, for example, in such a way that a determined temperature range is adjusted from yellow through orange to red. In so doing, in general, temperatures above this temperature range are uniformly displayed as red and temperatures below this temperature range are displayed as gray values.

For example, with a total dynamic range of 65,536 raw values, the range proceeds from 110° C. (yellow) through 120° C. (orange) to ≧900° C. (red). As another example, the range is from 300° C. (yellow) through 600° C. (orange) to ≧900° C. (red). In yet another example, the range from 300° C. to ≧1000° C. is divided into eight colors instead of three.

The two-step procedure also makes it possible, for example, to carry out the color display of the second step in the external computer.

In specific embodiment forms of the invention, characteristic lines which are monotonic and, additionally, either convex or concave over the total interval are of particular interest. In special cases, monotonic functions which are not convex or concave over the total interval may also be useful.

The reason that monotonicity is required is that it allows the characteristic line to be reversible as a mathematical function, i.e., the argument range (underlying temperature distribution) can be deduced unequivocally from the value range (image intensity shown in the display), i.e., while the image is purposely nonlinear and also should be in order to limit the dynamics and nevertheless be able to show sharply different temperature ranges with fidelity to detail, it nevertheless remains interpretable, i.e., the user can nevertheless clearly distinguish higher temperatures from lower temperatures at any time by looking at the image.

Beyond this, a concave characteristic line causes an accentuation of detail at low intensities compared with linear transfer, while at the same time overdriving is prevented at high intensities due to the—in the present case—greater flattening of the characteristic line. This is particularly useful in applications in which temperature ranges differ drastically but should still be represented together in the same image with adequate fidelity to detail.

Conversely, compared with linear transfer, a convex characteristic line causes an elevation of the sensitivity at higher intensities and a leveling off at low intensities. This can be useful in applications in which, for example, detail should be enhanced only at a higher intensity without having to fear overdriving. Also, a convex characteristic line can be useful for applications in which two different intensity ranges can be distinguished from one another more clearly than would be allowed by a linear transfer, for example, in order to prepare pattern recognition steps based on a threshold.

When every pixel is provided with its own characteristic line, it is generally useful that the quality of monotonicity and/or concavity/complexity is uniform for all of the pixels. Again, this is not in itself compulsory, but in practice it is often helpful in order to facilitate interpretation of the images.

In an embodiment form of the invention it may be useful, for example, that all of the characteristic lines are concave in order to achieve a reduction in imaging dynamics overall, but all with different characteristic lines which are carried out in such a way that residual non-uniformity remaining after a non-uniformity correction (NUC) implemented as a two-point correction is compensated by the variation between the characteristic lines of the individual pixels.

It may also be useful in particular embodiment forms, for example, to use a different characteristic line at the edge of the image than in the middle of the image when the camera is used for monitoring functions in which the expected intensity distribution differs appreciably between the middle of the image and the edge of the image.

Similarly, it could be useful in certain embodiment forms, for example, to use a different characteristic line in the upper area of the image than in the lower area of the image in case the expected intensity distribution differs between the top and bottom. Of course, there are many other conceivable applications in which local variation of the characteristic line can appear useful for specific applications.

Figure 3:
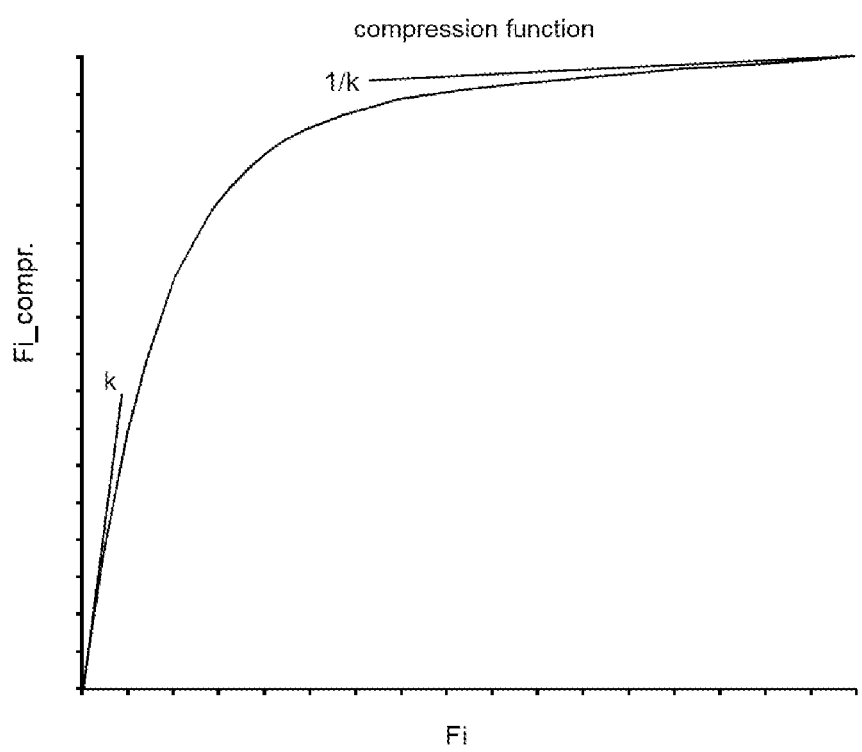
FIG. 3 a specific depiction of a nonlinear characteristic line.

FIG. 3 shows a particular selection of the characteristic line for an embodiment form of the invention that is calculated according to the following formula:

$$S_{out} = \frac{S_{max}}{1 + \frac{1}{k} - e^{-k}} \cdot \left(1 + \frac{S_{in}}{S_{max} \cdot k} - e^{-\frac{k \cdot S_{in}}{S_{max}}}\right),$$

where:
Smin is the minimum signal intensity
Smax is the maximum signal intensity
Sin is the input signal intensity
Sout is the output signal intensity
k is a compression parameter (meaningful values: 0.1 . . . 10).
In discretized form for 8-bit number representation (Smax=255), the formula reads:

$$Fi\_compr. = rounded\left(\frac{255}{1 + \frac{1}{k} - e^{-k}} \cdot \left(1 + \frac{Fi}{255 \cdot k} - e^{-\frac{k \cdot Fi}{255}}\right)\right),$$

Fi Color Index
k compression parameter (meaningful values: 0.1 . . . 10).

It is implicit in this choice of characteristic line that the curve at the minimum signal intensity 5 min, for example, the minimum color index Fi=0, starts by way of approximation with a slope k and, at the maximum signal intensity Smax, for example, the maximum color index Fi=255, ends by way of approximation with a slope 1/k. In other words, these slopes are reciprocal to each other on the one hand so that the greatest possible wealth of detail is achieved at low color indices and, at the same time, an extensive reduction in dynamics is achieved at high color indices to prevent overload.

However, e.g., in comparison to a logarithmic function which is extremely steep at Fi=0 on one hand and extremely flat in the upper color index range on the other hand, this characteristic line nevertheless has a finite and limited slope over the entire argument range. Further, this slope can be parameterized by parameter k, i.e., the "strength of the non-linearity" of the characteristic line can be deliberately adjusted by this parameter.

Figure 4:
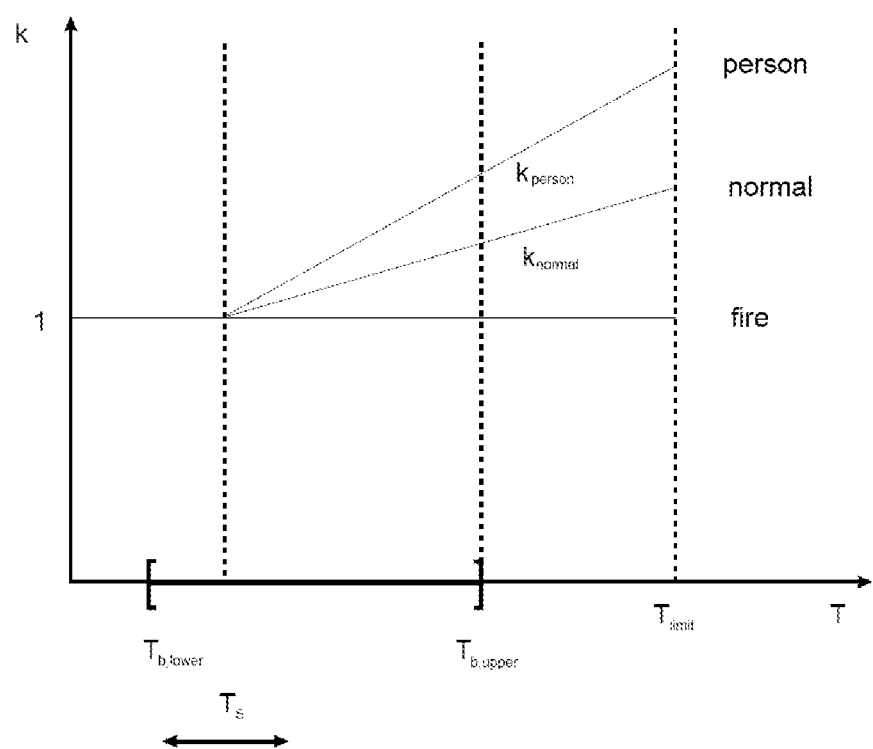
FIG. 4 three curves for the parameters determining the extent of dynamic compression.

FIG. 4 shows three curves for the parameter k determining the extent of dynamic compression.

The k curves in FIG. 4 extend horizontally at low temperatures until a threshold temperature TS and then linearly up to a limit temperature Tlimit, for example, the highest temperature that can be displayed by the thermographic camera 100, with a slope which can be set as a parameter and which is variously selected depending on whether the contrast curve is adjusted for the display of persons, where the selected slope is large above the threshold temperature TS so that sufficient detail can be detected at low temperatures, or for the display of fire, where the slope is flat or can even amount to zero so as to minimize overload at high temperatures. Normal scenery has a medium slope located in between.

The two plots work together such that, for example, the thermographic camera 100 initially automatically determines a temperature range of the displayed scenery. This temperature range has a lower range temperature TB,lower and an upper range temperature TB,upper.

Further, the user specifies, e.g., through menu selection, whether the contrast curve should be optimized for displaying persons, fire, or normal scenery between these two extremes. In so doing, one of the branches of the branched family of straight lines in FIG. 4 is chosen. The upper range temperature TB,upper then determines which k value is ultimately applied: kperson marked by a circle in FIG. 4 for displaying persons, or knormal for displaying normal scenery. The selected k value then determines the curvature of the curve shown in FIG. 3, i.e., the entire contrast curve is then determined by it for all displayable temperatures.

With a sharp curvature (large k value), e.g., the contrast in the lower temperature range is appreciably greater than in the upper temperature range (good for person-seeking). If there are no temperatures above Ts in the object scene, k=1, i.e., the contrast curve is approximately linear. As temperature increases, an increasingly larger temperature interval must be displayed and the contrast resolution would decrease. At temperatures above Ts, however, k takes on values>1 for displaying persons. The contrast of cold objects (at the expense of warmer objects) is increased again by the curved Fi characteristic line.

The threshold temperature TS can be 50° C., for example. However, it is an adjustable parameter and can be modified depending upon application. Typical applications are in fire-fighting, where it is used by firefighters to search for distressed persons on the one hand and hot spots on the other hand. Other applications include displaying unusual temperatures in industrial manufacturing, for example, in testing electronics components, waste heat in mechanical components or houses, or the like.

Regardless of the embodiment form, the characteristic line can be given either synthetically (e.g., the Fi characteristic line shown in FIG. 3) or can be determined in the course of calibrating the thermographic camera.

Typically, a NUC calibration is carried out as a two-point correction and a temperature calibration in a manner known to those skilled in the art. The same characteristic line can then be selected for all pixels. However, the characteristic lines need not be the same for all pixels. The use of characteristic lines which are not the same for all pixels but which share a common mathematical property of monotonicity, convexity or concavity can also substitute for a NUC calibration and/or a temperature calibration, but also brings about a reduction in the intensity dynamics and, therefore, improves fidelity to detail in the imaging at high and low temperatures.

The reversibility and uniqueness of the characteristic line are used in many of the embodiments according to the invention. This makes it possible, for example, to deduce a determined color in the object space based on a determined color or a determined displayed image intensity in the thermal image shown on the display. The reversibility and uniqueness of the characteristic line are also used internally in the thermographic camera 100, for example, to determine which signal intensity or which signal intensity range is needed for which color index. Therefore, as a rule, the characteristic lines are stored and used for both directions.

On the other hand, reversibility is deliberately omitted in certain embodiment forms of the invention in order to achieve other goals for which reversibility is not required or is even inconvenient. For example, in one embodiment form of the invention, the characteristic line can have a periodic profile, for example, a periodically recurring sawtooth. With a characteristic line of this type, the local spatial change in signal intensity can be visually represented very vividly like the contour lines on a geographical map, i.e., by the density of the stripes comparable to contour lines or areas of the same color or image intensity.

REFERENCE NUMERALS

1 IR optics
2 shutter control device
3 microbolometer FPA
4 readout unit
5 processor unit
6 clock control
7 shutter
8 bias generator
9 integration time preset unit
10 intermediate storage
11 intermediate storage
12 intermediate storage
13 intermediate storage
14 image data bus
15 control lines and address lines
16 display unit
17 computer interface
18 intermediate storage
19 intermediate storage
100 thermographic camera

What is claimed is:

1. A method for recording or modifying and reproducing thermal images of a scene or of an object, comprising: generating a pixel-based thermal image frame by infrared optics and a pixel-based detector unit or retrieving a pixel-based thermal image frame from an external source, generating a dark image for non-uniformity correction to eliminate non-uniformities arising from the detector or from sources of disturbance in an optical beam path,
  correcting the pixel-based thermal image frame by weighting individual pixel values with a nonlinear characteristic line generated and stored in advance to generate a corrected output thermal image, and providing the corrected output thermal image to a display unit or to an interface for external equipment, wherein the nonlinear characteristic line is calculated according to the formula:

$$S_{out} = \frac{S_{max}}{1 + \frac{1}{k} - e^{-k}} \cdot \left(1 + \frac{S_{in}}{S_{max} \cdot k} - e^{-\frac{k \cdot S_{in}}{S_{max}}}\right),$$

where:
$S_{min}$ is a minimum signal intensity,
$S_{max}$ is a maximum signal intensity,
$S_{in}$ is an input signal intensity,
$S_{out}$ is an output signal intensity, and
k is a compression parameter between 0.1 and 10.

2. The method of claim 1, further comprising generating and storing an associated nonlinear characteristic line for every pixel.

3. The method of claim 1, wherein for 8-bit number representation ($S_{max}$=255) in discrete form, the formula is:

$$Fi\_compr. = rounded\left(\frac{255}{1 + \frac{1}{k} - e^{-k}} \cdot \left(1 + \frac{Fi}{255 \cdot k} - e^{-\frac{k \cdot Fi}{255}}\right)\right),$$

where:
Fi is a color index, and
k is the compression parameter.

4. The method of claim 1, further comprising, after applying the characteristic line, displaying in color according to a color table,
  wherein the color table
    maps gray values to signals below a lower threshold,
    maps color levels from yellow through orange to red to signals between the lower threshold and an upper threshold in ascending order, and
    maps a red color to signals above the upper threshold.

5. A thermographic camera for the recording and reproducing thermal images of a scene or of an object, comprising: an IR objective, a pixel-based detector unit recording a pixel-based thermal image frame, and a processor unit controlling recording and correction processes, including non-uniformity correction and weighting of pixel signals with a nonlinear characteristic line of a pixel-based thermal image frame to generate a corrected output image provided to a display unit or to an interface for external equipment, wherein the nonlinear characteristic line is calculated according to the formula:

$$S_{out} = \frac{S_{max}}{1 + \frac{1}{k} - e^{-k}} \cdot \left(1 + \frac{S_{in}}{S_{max} \cdot k} - e^{-\frac{k \cdot S_{in}}{S_{max}}}\right),$$

where:
$S_{min}$ is a minimum signal intensity,
$S_{max}$ is a maximum signal intensity
$S_{in}$ is an input signal intensity,
$S_{out}$ is an output signal intensity, and
k is a compression parameter between 0.1 and 10.

6. The camera of claim 5, further comprising a shutter and a shutter control device for the non-uniformity correction.

7. The camera of claim 5, wherein the pixel-based detector unit is a microbolometer focal plane array.

8. The camera of claim 7, wherein an associated nonlinear characteristic line is stored in a storage for each microbolometer.

9. The camera of claim 5, wherein, after the nonlinear characteristic line is applied, a color table, adjusted to the characteristic line and stored, is used for color displaying.

* * * * *